Figure 1:
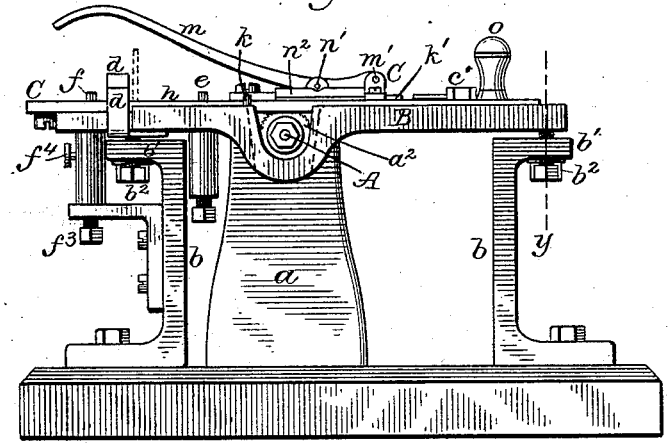

(No Model.)  5 Sheets—Sheet 1.

A. C. ESTABROOK.
MACHINE FOR GRAVING BRUSH HANDLES.

No. 347,700.  Patented Aug. 17, 1886.

Attest:
Philip F. Larner.
Lowell J. Bartle.

Inventor:
Alanson C. Estabrook,
By Wm C Mud
Attorney.

(No Model.) 5 Sheets—Sheet 2.

A. C. ESTABROOK.
MACHINE FOR GRAVING BRUSH HANDLES.

No. 347,700. Patented Aug. 17, 1886.

Attest:
Philip F. Larner.
Lowell Bartle.

Inventor:
Alanson C. Estabrook
By Wm C Wood
Attorney.

(No Model.) 5 Sheets—Sheet 3.
A. C. ESTABROOK.
MACHINE FOR GRAVING BRUSH HANDLES.
No. 347,700. Patented Aug. 17, 1886.
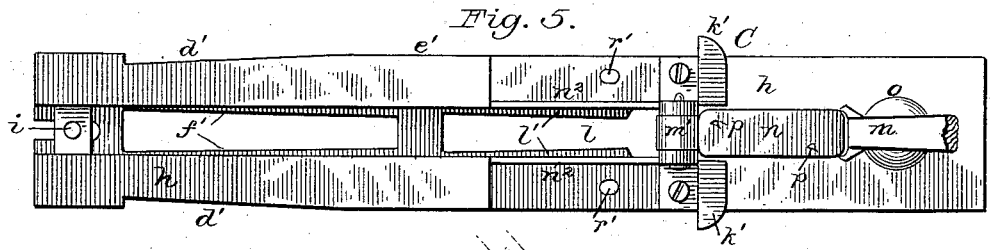
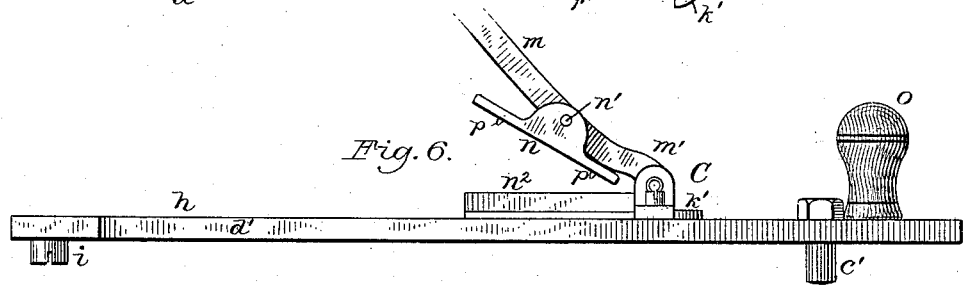
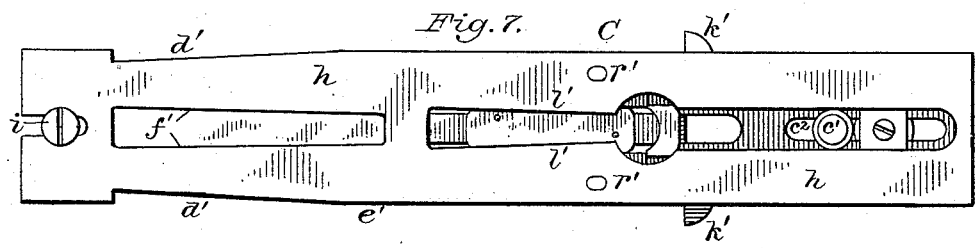
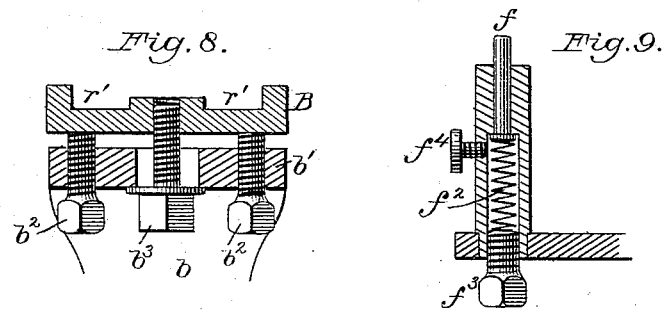
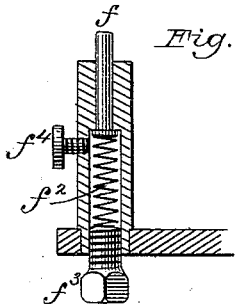
Attest:
Philip F. Larner
Howell Bartle
Inventor:
Alanson C. Estabrook
By
Attorney (No Model.) 5 Sheets—Sheet 4.
A. C. ESTABROOK.
MACHINE FOR GRAVING BRUSH HANDLES.
No. 347,700. Patented Aug. 17, 1886.
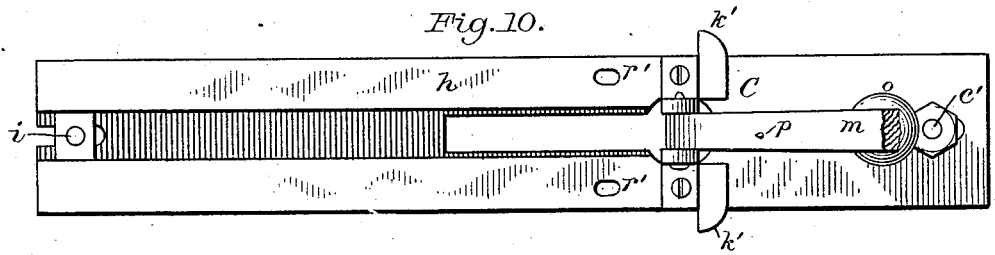
Fig. 10.
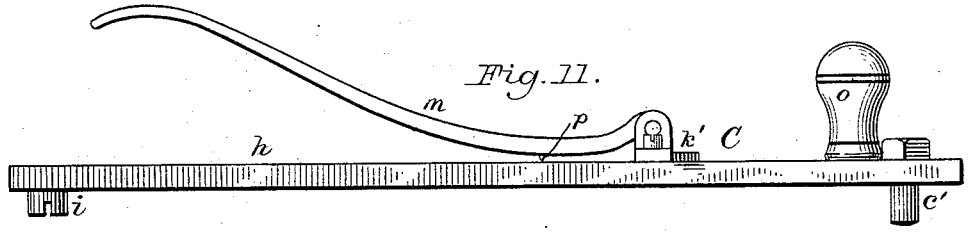
Fig. 11.
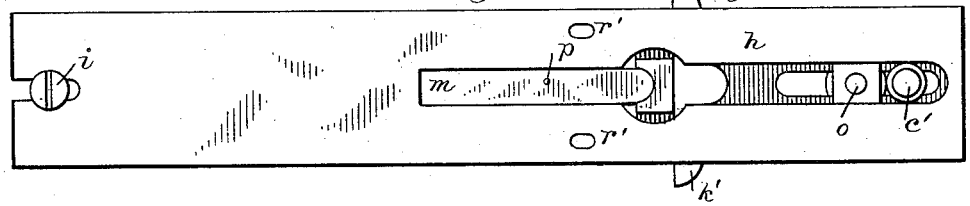
Fig. 12.
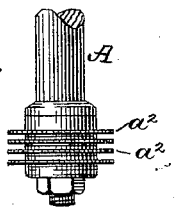
Fig. 13.
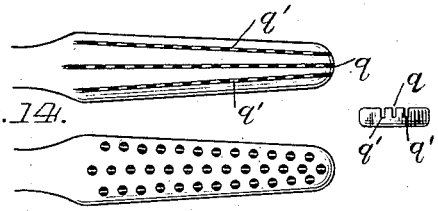
Fig. 14.
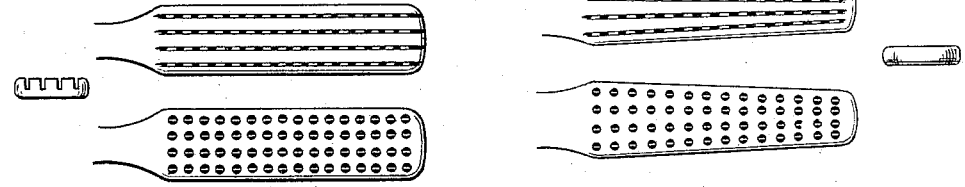
Fig. 15.
Fig. 16.
Attest:
Philip F. Larner
Howell Bartle
Inventor:
Alanson C. Estabrook
By Wm C Wood
Attorney.

(No Model.) 5 Sheets—Sheet 5.

A. C. ESTABROOK.
MACHINE FOR GRAVING BRUSH HANDLES.

No. 347,700. Patented Aug. 17, 1886.

Attest:
Philip F. Larner
Lowell J. Bartle

Inventor:
Alanson C. Estabrook
By M C Wood
Attorney.

UNITED STATES PATENT OFFICE.

ALANSON C. ESTABROOK, OF FLORENCE, MASSACHUSETTS, ASSIGNOR TO THE FLORENCE MANUFACTURING COMPANY, OF SAME PLACE.

MACHINE FOR GRAVING BRUSH-HANDLES.

SPECIFICATION forming part of Letters Patent No. 347,700, dated August 17, 1886.

Application filed April 30, 1886. Serial No. 200,676. (No model.)

*To all whom it may concern:*

Be it known that I, ALANSON C. ESTABROOK, of Florence, in the city of Northampton, county of Hampshire, and State of Massachusetts, have invented certain new and useful Improvements in Machines for Graving Brush-Handles; and I do hereby declare that the following specification, taken in connection with the drawings furnished and forming a part of the same, is a clear, true, and complete description of my invention.

Although machines embodying more or less of my present improvements are useful in the manufacture of brushes of various kinds, I have specially devised them for slotting or graving bone heads in the manufacture of tooth-brushes. In my Letters Patent No. 260,378, dated July 4, 1882, I disclosed certain improvements in this line, which are mainly applicable to what may be termed "curved-line graving," although certain portions of said improvements are also applicable to straight-line graving. So far as my knowledge extends, the only machines in use prior to my present invention are such as were disclosed in my aforesaid Letters Patent for curved-line graving, and certain other machines by which straight-line graving could only be performed at the hands of skilled workmen capable of locating at sight a brush-head in proper position with relation to the one or more saws which were relied upon for graving.

With machines embodying a portion of my present improvements, straight-line graving can be practically performed by unskilled labor, because the matter of gaging is placed wholly outside of optical calculation on the part of the operator, and involve for a proper presentation of a brush-head to the graving-tool purely mechanical operations in placing the head into a clamp and sliding the clamp forward, and the mere fact that any particular head has been thus placed and clamped in my machine affords a positive assurance that the head will be accurately presented to the graving-tool, if certain simple conditions be observed.

In certain varieties of tooth-brushes in which the rows of bristles are straight, but not parallel—as, for instance, such as have heads which are narrower at the outer end than at the inner end—the graving is angular, usually either in three, but sometimes in four, lines, diverging from the tip of the head toward its rear end and exactly coincident with the several corresponding lines of bristle-holes. This variety of graving has always heretofore been performed by hand, and it requires a higher degree of skill than any other operation in brush-making.

With machines embodying certain features of my present invention angular-line graving can be performed as readily by comparatively unskilled labor as the straight-line graving hereinbefore referred to.

In my aforesaid patented machines the edge of the brush-head serves as a gage-surface for accurately locating the outer graving-lines with relation to the edge of the brush-head; but the edge of the head is thus rendered practically available only when the brush-handles have been developed under a certain method, substantially as disclosed in Letters Patent No. 260,374, dated July 4, 1882, by which counterpart handles are produced.

In machines embodying portions of my present improvements the edges of the brush-head can be relied upon for properly gaging the heads in the clamp; but my improved machines are of equal value, whether the heads to be graved have been produced by the counterpart system, under which all the heads developed from certain sections of bone are alike, or by the older methods, under which variations in size and form are the rule, even among heads of handles made from the same variety of bone-sections. To accomplish this result, I have now for the first time so devised my machines that the brush-head is gaged in position without the aid of its edges; or, in other words, the gaging-points of contact with the brush-head are centrally located, as distinguished from being located at the edges of the head. This central gaging-contact is effected by the use in the clamp of short studs or pins, which enter and occupy two or more of the bristle-holes, and inasmuch as the lines of graving should always be coincident with the center of each row of bristle-holes, it follows that these latter, being accurately located in the clamp, and the latter being properly guided, the graving-lines must of necessity be properly defined.

I have also devised various minor improvements, and, after fully describing the machines illustrated in the drawings, the features deemed novel will be specified in the several clauses of claims hereunto annexed.

Figure 2:
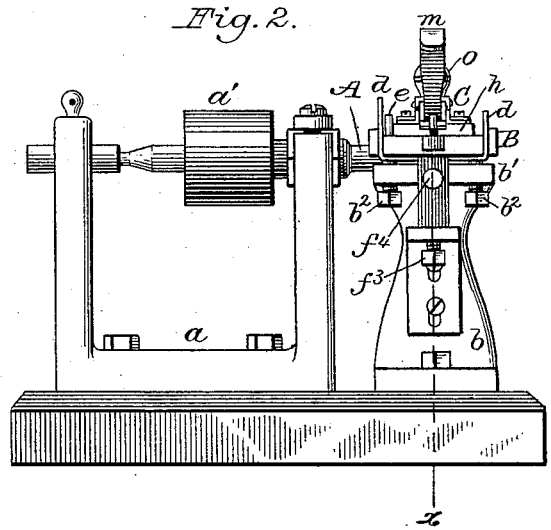
Figure 3:
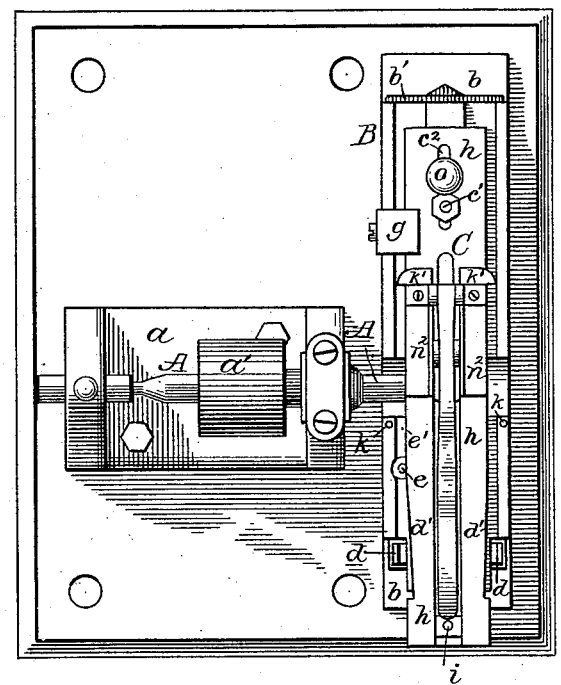
Figure 4:
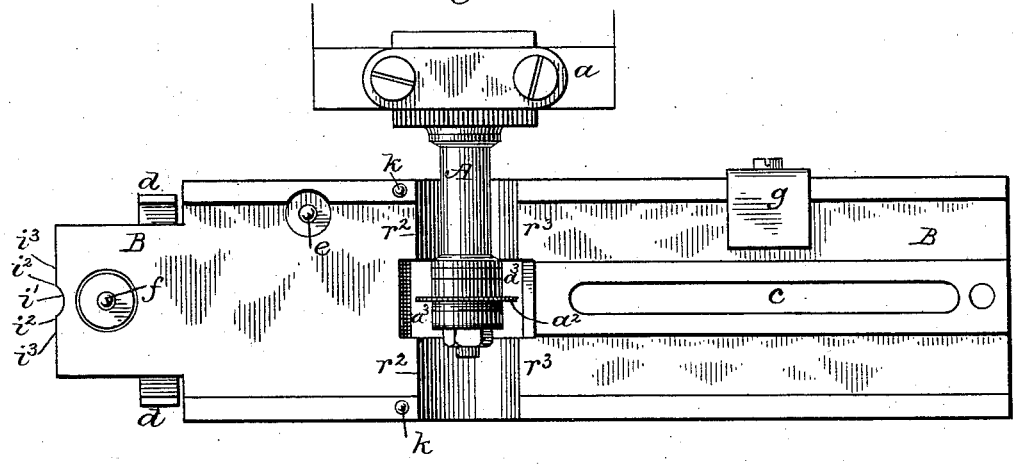
Figure 17:
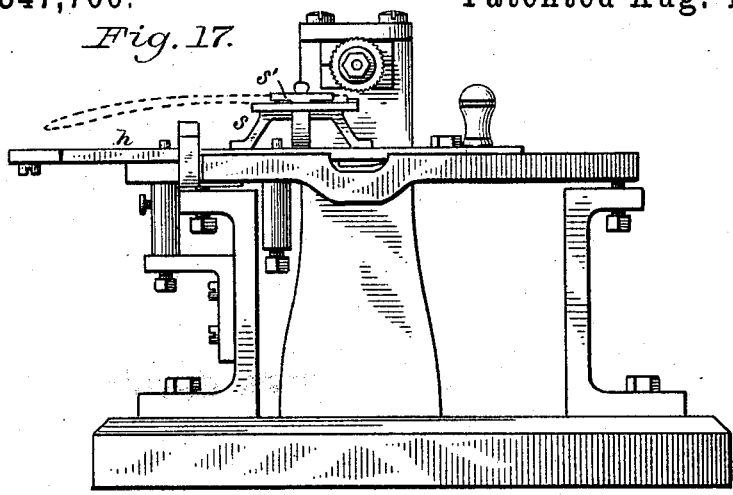
Figure 18:
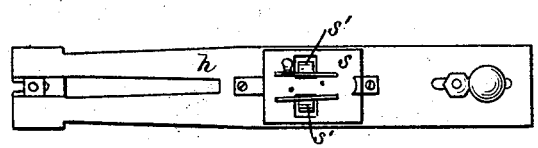
Figure 19:
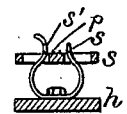
Figure 20:
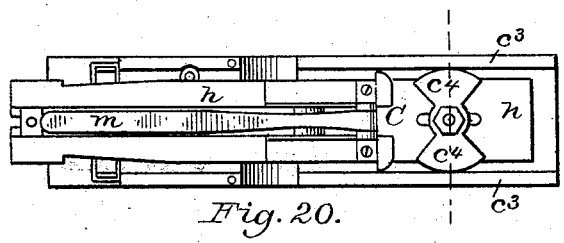
Figure 21:
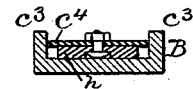
Figure 22:
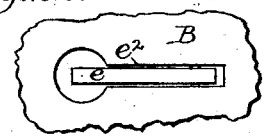
Figure 24:
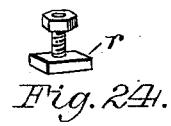
Figure 23:
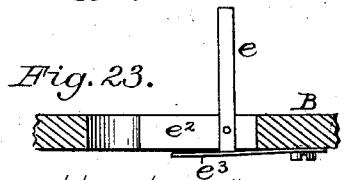

Referring to the drawings, Figure 1 is a side elevation of a machine embodying the several features of my invention. Fig. 2 is a front end view of the same. Fig. 3 is a top or plan view of the same. Fig. 4 is a top or plan view of a portion of the machine with the clamp removed from its bed. Figs. 5, 6, and 7 respectively illustrate the detached clamp in top, edge, and bottom views. Fig. 8 is a lateral vertical section on line $y$, Fig. 1. Fig. 9 is a similar section on line $x$, Fig. 2. Figs. 10, 11, and 12 respectively illustrate in top, edge, and bottom views a detached clamp as constructed by me for use in graving parallel lines. Fig. 13 illustrates the saw-arbor with four saws as used for parallel graving. Figs. 14, 15, and 16 respectively illustrate brush-heads having three and four lines of angular graving, and also a head with four lines of parallel graving, each figure showing both sides of the head and including an end view thereof. Fig. 17 illustrates in side view a machine embodying the bed and gaging devices, as in Fig. 1, but with the graving-tool located above the bed and a head-clamp which has spring-jaws somewhat similar to the clamp described in my aforesaid prior Letters Patent. Figs. 18 and 19, in top view and lateral central section, illustrate the clamp of Fig. 17 detached. Figs. 20 and 21, in top view and cross-section, illustrate a bed and a clamp pivotally mounted thereon and longitudinally guided by means of a guiding-plate and flanges at each side of the bed. Figs. 22 and 23, in top view and section, illustrate a retractile guide-stud, differing in construction from those in Fig. 1, but capable of use in lieu thereof. Fig. 24 illustrates one of a pair of drop-blocks for use on the clamp for locating the front ends of the graved lines back of the front end of a brush-head.

I will first describe one of my machines as illustrated in Figs. 1 to 7, inclusive, and organized to perform angular graving, such as is illustrated in Figs. 14 and 15, one of the brush-heads there shown having three lines of graving, and the other four lines, and in both cases the graved lines diverge from the front end of the head toward the rear end. A suitable foundation should in all cases be provided on which the several parts of the frame can be firmly mounted without liability of derangement by warping or twisting, and hence I prefer to employ a metal bed-plate adapted to be secured to a work-bench, and provided with suitable holes for receiving bolts or screws, by which the machine can be securely mounted.

The best form of graving-tool known to me is a thin light circular saw mounted on an arbor and rapidly rotated. The saw-arbor A can be variously mounted, but its bearings are constructed in the usual manner, with a view to preventing longitudinal movement. The arbor-frame $a$ is rigidly secured in position, and power is applied to the arbor by a belt over the pulley $a'$. The graving-saw $a^2$ is mounted at the outer end of the arbor, by means of a clamp of the usual type, a series of washers, $a^3$, being employed to admit of variably locating the saw on the arbor, and also to enable two or more saws to be clamped side by side, when desired. In many cases it is preferable that the saws be sharpened while in their clamp, and hence it is advisable that the arbor-bearings be capable of being readily separated for convenience in removing the arbor therefrom. At right angles to the arbor and its frame, and parallel with the saw, and in front and in rear thereof, is the clamp-bed B, which is securely mounted on the tops of two standards, $b$, which in turn are adjustably but firmly bolted to the bed-plate or other foundation. Each standard at its top and at one side has a lateral flange, $b'$, through which three bolts pass for engaging with the overlying end of the clamp-bed. These bolts are in line with each other, and the two outer bolts, $b^2$, are tapped into the flange or bracket, and abut with their tips against the under side of the bed; but the central bolt, $b^3$, passes loosely through said bracket, and its tip occupies a tapped hole in the bed, as illustrated in the sectional view, Fig. 8. This, or an equivalent mode of mounting the bed, is essential, inasmuch as the bed must be capable of being vertically adjusted with great nicety, both longitudinally and laterally, because of the importance of exactly graduating the bed with reference to the saw, for determining the depth of the cut in graving, and also for compensating for the gradually-reduced diameter of the graving saw incident to its wear and to sharpening. The top of the clamp-bed B is provided with guiding-contacts, so that they may co-operate with other contacts for accurately guiding a sliding clamp, C, which carries the brush-head to be graved. The central longitudinal slot, $c$, extends through the bed for a considerable portion of its length at the rear of the saw, and this serves as a right-line guiding-slot for said clamp, which is provided with a pendent stud, $c'$, which occupies said slot, as will hereinafter be further described. At the front end of the bed stationary studs or side guides, $d$, are located opposite each other for engagement by the rear side edges, $d'$, of the clamp. These stationary studs are mere guiding contacts or abutments, and can be indefinitely varied in form and construction; but their location should of course be accurately determined. Two other clamp-guides, $e$ and $f$, are employed, and inasmuch as these are only interchangeably required for separate service both are retractile, or, in other words, arranged to be readily displaced. They may be in the form of pins, readily removed from holes in the bed, into which they would snugly fit, but in such case they would involve special manipulation and be liable to get lost or misplaced, and therefore, in their best form, each is fitted to slide vertically in its seat and is supported by a spring, so that either or both can be readily depressed or dropped when not required and secured in their retired position. The retractile guide $e$ is located between one of the stationary standards and the saw, near one side of the bed, and it is engaged in contact by the guide-surface $e'$ on one side of the clamp. The spring-guide $f$ is located within a tubular bracket projecting from the front standard $b$, and is located in line with the center of the bed, so that it may extend upward through a hole in the bed, and co-operate with the sides of the central angular guide slot, $f'$, in the clamp.

In Fig. 9 I show in section the bracket containing the guide $f$, its spring $f^2$, a base-screw, $f^3$, and a lateral thumb-screw, $f^4$, by which the guide, when depressed, may be secured in that position; and it is to be understood that the spring-guide $e$ is similarly arranged. A somewhat simpler form of retractile guide may be provided by hinging a stud to the top of the bracket or to the clamp bed B, as illustrated in Figs. 22 and 23, wherein the bed is shown to be slotted, as at $e^2$, and the guide-stud is hinged on a transverse pivot and backed by a spring, $e^3$, after the manner of a jack-knife blade; but in this case the stud must be specially raised and dropped by hand, whereas with the sliding stud the clamp is used for depressing the stud, for keeping it down at intervals, and it is lifted by its own spring when the clamp permits it to do so. It is sometimes desirable to have an angle arm, $g$, secured to one side of the bed, and sufficiently overhanging the clamp to confine its front end against undue vertical movement when in position for service, although when the clamp has been drawn fully rearward its rear end can be readily lifted and the clamp then removed from the bed. The clamp C essentially includes means for properly holding the brush-handle at its head, and these will be hereinafter specially described. Said clamp also essentially includes a plate, $h$, or an equivalent base in some form, which can carry or afford the requisite guiding-contacts to co-operate with the several guiding-studs—as, for instance, for co-operating with the guiding-slot $c$ in the clamp-bed. The clamp is provided with a pendent round stud, $c'$, which accurately fills the said slot laterally, and in a machine restricted to straight-line graving, and also to graving angularly in some one particular way, said stud $c'$ may be fixedly mounted in the clamp; but to provide for variations in angular graving, said stud is located within a longitudinal slot, $c^2$, in the clamp-plate, and is provided with a screw-threaded tip, a shoulder, and a clamp-nut, thus enabling said stud to be longitudinally adjusted. This pivotal relation as between the clamp and the bed, at the rear of the saw, is an essential feature, however it may be provided for, and the pivotal point or center of motion must always be in an exact line with the saw, and when the clamp is moved longitudinally on the bed, said point must be restricted to a path or line exactly at right angles to the axis of the saw.

The straight guiding edge $e'$ of the clamp is parallel with its longitudinal center, and said edge, with the stud $e$, constitutes one set of guiding-contacts for limiting the path of the clamp with relation to the saw to a line at right angles to the axis of the saw, and the two angular outside edges, $d'$, of the clamp, with the two stationary studs $d$, serve as another set of guiding-contacts for limiting the path of the clamp to lines which are angular to said axis, and these two sets of contacts co-operate for doing what I will call "three-line angular graving;" and the last referred to set of contacts co-operate with still another set, which includes the guiding-stud $f$ and the inclined edges of the slot $f'$, for doing four-line angular graving, as will hereinafter be more fully described.

For limiting the forward movement of the clamp, it is provided with a stop (see Figs. 5, 6, and 7) at the under side of its rear end, usually in the form of a stop-block, $i$, which is preferably adjustable and abuts (see Fig. 4) against the front end of the bed, either at the central point, $i'$, or the two points $i^2$ on each side thereof, or the two points $i^3$ outside of said points $i^2$, according to circumstances, as will hereinafter be made fully apparent.

Inasmuch as the graving operation involves a high degree of accuracy and a specially fine adjustment of the clamped brush-head with relation to the graving-tool, the gaging-contacts should be composed of metal, and such of the gaging-studs as are capable of being moved should be practically rigid against displacement while in actual service. It is generally desirable that the clamp be also limited in its rearward movement, and therefore studs $k$ are provided—one at each side of the bed—with which the lateral lugs $k'$ on the clamp-plate engage, it being obvious that said stud and lugs, or their equivalent abutting contacts, may be respectively located in any position on the clamp and bed which will enable them to co-operate for the purpose stated.

It is now to be understood that the means by which the brush-head may be clamped may be largely varied without departure from all those portions of my invention which refer to variably guiding the clamp, so long as the clamping contrivance is capable of accurately adjusting the central line of the head to be graved exactly in line with the saw. It is also to be understood that while it is practicable to construct the clamping contrivance so that it may equally well control heads of somewhat varied outline, it is desirable, as a rule, that several clamps be employed, each specially adapted to receive brush-heads approximately corresponding in outline and dimensions.

Brush-heads vary in thickness; but this need involve no variation in the clamping device. In many cases the front end of a head is thinner than the rear end, and this involves, for obtaining the best results, either a clamping-recess or brush-head seat into which the head may be wedged laterally, or a recess into which the head may loosely enter and occupy, coupled with a clamping-bar of some kind, which can adjust itself to the bored side of the head, while the back is maintained in a horizontal plane corresponding to or parallel with the top of the clamp-bed.

The clamp seat or recess $l$ in Figs. 3 and 5, as well as in all clamps for this service, must have a bearing-surface for supporting the brush-head, and when the clamp is above the saw this surface is best afforded by a flange at each side of the bottom of said recess, as shown at $l'$. The particular clamp shown in these figures is especially adapted to receive such semi-pointed heads as are shown in Figs. 14 and 15, and hence the flanges of the recess are correspondingly inclined. The hand-lever $m$ is at one end pivoted or hinged, as at $m'$, to the clamp-plate $h$, and it has at a proper point in front of its hinge a shoe, $n$, which is hinged or pivoted to said lever at $n'$, so that said shoe may tilt longitudinally to an extent equal to the greatest variations liable to occur between the thickness of the front end of a brush-head and its rear end. At the sides of the clamp-recess there are vertical guiding surfaces or flanges $n^2$, which have sides exactly parallel with the longitudinal central line of the clamp and the clamp-bed, and the lateral space between these guiding-flanges is just sufficient to enable the shoe $n$ to pass downward, and thereby be accurately adjusted longitudinally. When said lever $m$ is brought down upon a brush-head, said shoe adapts itself to the bore side of said head, and enables it to be firmly clamped, while pressure is applied by one hand of the operator upon the free end of the lever, which may also serve as a handle for moving the slide, the other hand of the operator being applied to the knob $o$ near the opposite end of the plate $h$. With a clamping-recess accurately shaped and proportioned to snugly receive a brush-head laterally, the clamp-lever need have no shoe; but a single spur, $p$, is then desirable thereon, as shown in Figs. 10 and 11, for engaging with the head to prevent its backward movement in said recess while engaged by the saw. When the clamp-recess is not adapted to engage with the sides of a brush-head, the shoe and its spurs $p$ are specially important, because said spurs being properly located will each enter a bored hole in a head, and the guiding-flanges $n^2$ will cause the central longitudinal line of the brush-head to exactly coincide with the central longitudinal line of the bed, and also with a saw, when but one saw is used. This adjustment of the brush-head in the clamp by means of the gaging-studs and bored holes also assures the coincidence of the graved lines with the centers of each longitudinal row of holes.

While the bed provided with the central guiding slot, $c$, and the clamp provided with the adjustable pendent guiding-stud $c'$ is deemed by me preferable to any other construction of these parts known to me for affording a pivotal slide, it is to be understood that I do not restrict myself to this precise form, because the guiding-slot $c$ will in substance be afforded by vertical flanges or side guides, as at $c^3$, at each side of the bed, as shown in Figs. 20 and 21, wherein I show a double quadrant-plate, $c^4$, mounted on the clamp-plate, so that the semicircular edges of said plate $c^4$ will be in close contact with the inner surfaces of the side guides, $c^3$, thus permitting the clamp to slide freely, but confining it laterally and pivoting it, substantially as in Fig. 1, the space between the flanges $c^3$ affording a wide slot, in lieu of the narrow slot $c$, before described, and the semicircular edges of the plate $c^4$ serving as the sides of a large pivot, in lieu of the small pivot or stud $c'$, and with either form the pivotal point is longitudinally adjustable, and precisely the same results would accrue if the plate $c^4$ had straight ends, so as to serve as a mere cross-head to which the clamp-plate $h$ was pivoted.

Referring now to Figs. 14 and 15, it is to be understood that such angular graving has always been heretofore done by hand, the workman holding the handle of the brush in one hand and passing it over a saw operating in a slot in a table, as is usual in saw-tables. The brush-head, Fig. 14, has three lines of graving, the central line, $q$, being parallel with the center of the head, and the outer lines, $q'$, being angular thereto and diverging from the front end of the head toward the rear. In performing this service the guide $f$ is not required, and hence it is depressed and kept out of working position. Assuming a brush-head to be in the clamp, and the latter so located that the end of said head is in front of the saw, the rear end of the clamp is swung to one side until one edge, $d'$, is in contact with the coincident stationary stud $d$, and then it is moved forward for graving one of the outer lines, $q'$, after which the clamp is returned in the same path. Then the rear end of the clamp is swung toward and against the retractile guide $e$, which is then engaged in gaging-contact with the straight guiding-surface $e'$ on the plate $h$, after which the clamp is advanced and retired, thus graving the central line, $q$, which is parallel to the longitudinal axis of the head. Then the rear end of the clamp is raised, so as to overlie the guide $e$, and then depressed, thus putting said guide down out of the way and enabling the surface $d'$ on that side of the clamp-plate $h$ to engage in contact with the adjacent guide-stud $d$; and in order that this latter may not be overridden by the clamp after its rear end has been lifted, it is advisable that this last referred to stud $d$ be of considerable height, or accompanied by a supplemental stud of proper height, as indicated in dotted lines in Fig. 1. The forward movement of the clamp is limited by the engagement of the stop-block $i$, hereinbefore referred to, and it will be observed that the central line of graving is extended farther to the rear than the side lines, or, in other words, it is longer than the other. When doing three-line graving, the block $i$ abuts against the front end of the bed, where it is centrally recessed slightly, as at $i'$, so as to permit the clamp to be moved forward farther in making the central cut than when said block abuts against either point $i^3$, as when making the outer cuts.

Now, referring to the four angular line brush-head, Fig. 15, it will be seen that neither of said lines is parallel with the center of the head, and that all are angular to the longitudinal axis of the head. For performing this service the use of the spring-stud $e$ is not involved, and hence it is depressed and kept out of the way, and the guide $f$ is released and permitted to do duty, in connection with the slot $f'$, for graving the two inner lines, the set of guiding-contacts $d$ and $d'$ then operating precisely as before described, the retractile guide $f$ being at intervals held down by the clamp, as in the case of the guide $e$, before described, when it co-operates with the guiding-contacts $d$ and $d'$. It will be seen that the two inner lines are of equal length, but slightly longer than the outer lines, and this is because the stop-block $i$ abuts at the points $i^2$ and $i^3$, it being obvious that the angle at which the rear end of the clamp is set and moved will cause the length of cut to be varied, because in swinging said rear end the guide-block is moved in the arc of a circle, to a greater extent in adjusting for the outer lines than for the inner lines, and hence the stop-block permits the clamp to move farther forward in graving the central lines than in graving the outer lines.

Referring to Figs. 14 and 15, it will be seen that end views of the two heads are given, and that the end of the head, Fig. 14, shows the graved lines, as is the case when the head is directly advanced to the saw, and differing from the end view of Fig. 15, in which the graving-lines do not show, because the head is first placed above the saw and then dropped thereon as it is advanced. This is accomplished by the use of drop-blocks $r$, properly located on the under side of the plate $h$, and these may be permanently applied, or detachably, as desired. As here shown, said blocks are detachably mounted by means of the holes or slots $r$ and a bolt, as shown in Figs. 5 and 24. It will be seen that these blocks cause the brush-head to be elevated above the path of the saw, so that as the clamp is moved forward the end of the head is carried above the saw until the blocks drop by passing over the lateral edge $r^2$ of the bed in front of the saw into the recess there formed, thus locating the front end of the graving-line at a desired distance at the rear of the head. The top of the bed at the rear of the saw is channeled, as at $r^3$, at both sides, as shown in Fig. 4, so as to afford space for the drop blocks as they advance with the clamp.

Now, referring to Fig. 16, it will be seen that this brush-head has four lines of graving which are parallel, and hence four saws can be grouped on the arbor, as shown in Fig. 13, and enable all of the lines to be graved during a single forward movement of the clamp. As this variety of graving is generally applied to parallel-sided heads, the clamp-recess is correspondingly formed, as illustrated in Fig. 10. In operating with a gang of two or more saws, of which any desired number may be used, only the guide $e$ is in actual service, and this, if desired, may be supplemented by a similar pin at the opposite side of the guide-plate.

For angularly graving a two-line head, the spring-pin $e$ would be out of service. The divergence of the lines can be readily varied by advancing or retiring the central guide-stud, $c'$, thus enabling the guide-studs $d$ to co-operate therewith in defining any angular path desired.

It is now to be understood that, while my machine in its best form is capable of interchangeable use for angular graving, whether in two or more lines, or straight graving, more or less of the features of invention devised by me and duly specified in my claims may be embodied in a machine restricted to graving in two angular lines, or in three, or in four, or any other number of such lines; and, also, that certain portions of my invention can be profitably embodied in a machine restricted to parallel-line graving.

While I deem it best for straight-line graving, whether in angular or in parallel lines, to have the clamp located above the saw, as in Fig. 1, it will be obvious that certain features of my present invention can be profitably employed if the saw be located above the clamp and its bed, as, for instance, as illustrated in Figs. 17, 18, and 19. In this case, in order to provide for properly placing the brush-head in the clamp-seat or recess, regardless of the bends or curves of the brush-handle, (shown in dotted lines in Fig. 17,) said recess is located in the top of a standard, $s$, on the plate $h$, and it embodies a bearing-plate and two co operating jaws, $s'$, one or both of which are springs, or are actuated by springs, which enable them to clamp a brush-head laterally, after the manner of the clamp in my prior patented machines. If the brush-heads to be graved are counterparts, one of said jaws may be stationary, to serve as a gaging-contact; but such heads, and others less uniform in contour, can be accurately held in position when both jaws are actuated by a spring or springs, if the gaging studs or pins $p$ are employed in the bearing-plate for entering the bored holes of a head, and performing the same service in gaging as when they are employed on the shoe $n$ in the machine shown in Fig. 1.

Having thus described my invention, I claim as new and desire to secure by Letters Patent—

1. In a brush-head-graving machine, the combination, substantially as hereinbefore described, of the rotary graving-saw, a clamp-supporting bed extending to the front of and also to the rear of said saw and at right angles to its axis, a clamp adapted to confine a brush-head in position for graving and to slide longitudinally on said bed, but pivoted at one end with relation to said bed at the rear of and in line with the saw, and also free to move laterally on said bed in front of the saw, and guiding-contacts on said bed and clamp in front of the saw for limiting the lateral movement of the rear end of the clamp, and thereby defining the angles occupied by said clamp with relation to the saw during the longitudinal movement of the clamp in graving a brush-head.

2. The combination, substantially as hereinbefore described, of the rotary graving-saw, the clamp-supporting bed, and the brush-head clamp sliding on said bed but pivoted thereon in line with and at the rear of the saw and free to move laterally on said bed in front of the saw, and one set of guiding-contacts on the bed and clamp for limiting the path of the clamp on the bed to a line at right angles to the axis of the saw, and a second set of guiding-contacts for limiting the path of said clamp to lines angular to said axis, whereby a brush-head may be graved in a central line parallel with its longitudinal axis and in angular lines on each side of said central line.

3. The combination, substantially as hereinbefore described, of the rotary graving-saw, the clamp-bed, the pivoted brush-head clamp sliding longitudinally on said bed, one set of guiding-contacts for limiting the path of said clamp with relation to the saw to two widely-diverging lines, and a second set of guiding-contacts for limiting said path to two interior lines of lesser divergence.

4. The combination, substantially as hereinbefore described, of the rotary graving-saw, the clamp-bed, the brush-head clamp pivoted at its front end and sliding longitudinally on said bed, guiding-contacts for limiting the path of said clamp to lines angular to the axis of said saw, and a stop for variably limiting the forward movement of said clamp according to the angular variations in said path, whereby in graving brush-heads having three or four line angular graving, the length of the lines is limited, and the interior lines of graving extended at the rear end of the brush-head beyond the ends of the outer or side lines.

5. The combination, substantially as hereinbefore described, of the rotary graving-saw, the clamp-bed, the brush-head clamp sliding on said bed, pivoted at the rear of the saw, and free to move laterally in front of the saw, and one or more retractile guiding-studs in front of the saw, whereby said studs may be readily placed in or out of service in co-operating with guiding-surfaces on the clamp for defining its path with relation to the saw.

6. The combination, substantially as hereinbefore described, of the rotary graving-saw, the clamp-bed, the brush-head clamp sliding on said bed above the saw, and provided with side flanges for supporting a brush-head at its edges and having a hand-lever for confining a brush-head upon said flanges and holding the same while moving toward and from the saw.

7. The combination, substantially as hereinbefore described, of the rotary graving-saw, the clamp-bed, and the brush-head clamp sliding on said bed and provided with gaging studs or pins for occupying two or more holes in a brush-head, and thereby centering it longitudinally in said clamp.

8. The combination, substantially as hereinbefore described, of the rotary graving-saw, the clamp-bed, and the brush-head clamp provided with shoe-guiding flanges and having a hand-lever provided with a clamping-shoe pivoted thereon, and having two or more gaging studs or pins projecting from its face and adapted, when entered into the holes of a brush-head, to adjust and confine said head with its longitudinal center coincident with the longitudinal center of the clamp.

9. The combination, substantially as hereinbefore described, of the rotary graving-saw, the clamp-bed recessed at the saw and provided with longitudinal channels at both sides of its center at the rear of the saw, and a brush-head clamp sliding on said bed above the saw and provided with blocks on its under side, for causing the clamp to carry the front end of a brush-head wholly above the saw and then to drop for placing the head in contact with said saw, at the rear of the front end of the head.

ALANSON C. ESTABROOK.

Witnesses:
N. P. WINEBULL,
S. W. WARREN.